(12) United States Patent
Tian et al.

(10) Patent No.: US 10,387,161 B2
(45) Date of Patent: Aug. 20, 2019

(54) TECHNIQUES FOR CAPTURING STATE INFORMATION AND PERFORMING ACTIONS FOR THREADS IN A MULTI-THREADED COMPUTING ENVIRONMENT

(71) Applicant: Facebook, Inc., Menlo Park, CA (US)

(72) Inventors: Yuandong Tian, Belmont, CA (US); Qucheng Gong, Daly City, CA (US); Yuxin Wu, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 15/694,673

(22) Filed: Sep. 1, 2017

(65) Prior Publication Data
US 2019/0073224 A1    Mar. 7, 2019

(51) Int. Cl.
*G06F 9/46* (2006.01)
*G06F 15/18* (2006.01)
(Continued)

(52) U.S. Cl.
CPC .......... *G06F 9/3851* (2013.01); *G06F 9/4881* (2013.01); *G06N 20/00* (2019.01);
(Continued)

(58) Field of Classification Search
CPC .... G06F 9/3851; G06F 9/4881; G06F 9/4843; G06F 9/3009; G06F 9/30123; G06F 9/44563; G06F 9/461; G06F 9/544; G06F 15/18; G06N 99/005; G06N 5/04; G06N 5/025; G06N 20/00; G06N 20/10;
(Continued)

(56) References Cited

U.S. PATENT DOCUMENTS

| 6,598,122 | B2 * | 7/2003 | Mukherjee | G06F 9/383 711/126 |
| 7,296,007 | B1 * | 11/2007 | Funge | A63F 13/10 345/156 |

(Continued)

OTHER PUBLICATIONS

Andrew Mass, et al., "Rectifier nonlinearities improve neural 325 network acoustic models", In Proceedings of ICML, vol. 30, 2013, 6 pages, retrieved and printed on Oct. 3, 2018.

(Continued)

*Primary Examiner* — Daniel H Pan
(74) *Attorney, Agent, or Firm* — Kilpatrick Townsend & Stockton LLP

(57) ABSTRACT

Techniques are disclosed for implementing an extensible, light-weight, flexible (ELF) processing platform that can efficiently capture state information from multiple threads during execution of instructions (e.g., an instance of a game). The ELF processing platform supports execution of multiple threads in a single process for parallel execution of multiple instances of the same or different program code or games. Upon capturing the state information, one or more threads may be executed in the ELF platform to compute one or more actions to perform at any state of execution by each of those threads. The threads can easily access the state information from a shared memory space and use the state information to implement rule-based and/or learning-based techniques for determining subsequent actions for execution for the threads.

20 Claims, 5 Drawing Sheets

(51) Int. Cl.

| | |
|---|---|
| G06N 5/02 | (2006.01) |
| G06F 9/38 | (2018.01) |
| G06F 9/48 | (2006.01) |
| G06N 20/00 | (2019.01) |
| G06N 20/10 | (2019.01) |
| A63F 13/67 | (2014.01) |
| G06F 9/445 | (2018.01) |
| G06F 9/54 | (2006.01) |
| G06F 9/30 | (2018.01) |
| A63F 13/79 | (2014.01) |
| G06N 20/20 | (2019.01) |

(52) U.S. Cl.
CPC .............. A63F 13/67 (2014.09); A63F 13/79 (2014.09); G06F 9/3009 (2013.01); G06F 9/30123 (2013.01); G06F 9/44563 (2013.01); G06F 9/4843 (2013.01); G06F 9/544 (2013.01); G06N 5/025 (2013.01); G06N 20/10 (2019.01); G06N 20/20 (2019.01)

(58) Field of Classification Search
CPC ......... G06N 20/20; A63F 13/67; A63F 13/71; A63F 13/73; A63F 13/79; A63F 13/795; A63F 13/798
USPC ........ 712/215, 227, 228; 706/12, 21, 46, 47; 718/108
See application file for complete search history.

(56) References Cited

U.S. PATENT DOCUMENTS

| | | | | |
|---|---|---|---|---|
| 2009/0254336 | A1* | 10/2009 | Dumais | G06F 9/451 704/9 |
| 2009/0327172 | A1* | 12/2009 | Liu | G06N 99/005 706/12 |
| 2013/0157607 | A1* | 6/2013 | Paek | H04W 4/90 455/404.1 |
| 2016/0048771 | A1* | 2/2016 | Chen | G06N 5/025 706/12 |
| 2017/0259178 | A1* | 9/2017 | Aghdaie | A63F 13/73 |
| 2018/0063386 | A1* | 3/2018 | Sharma | G01T 1/02 |

OTHER PUBLICATIONS

Richard Sutton, et al., "Policy Gradient Methods for Reinforcement Learning with Function Approximation", In (NIPS) Advances in Neural Information Processing Systems 12, vol. 99, 1999, pp. 1057-1063, retrieved and printed on Sep. 7, 2018, retrieved and printed on Oct. 3, 2018.
OpenAI "Universe" Dec. 5, 2016, retrieved from https://blog.openai.com/universe/ and https://github.com/openai/universe and printed on Oct. 3, 2018.
"BattleCode", Battlecode, mit's ai programming competition: https://www.battlecode.org/., 2017.
"OpenRA", Openra: http://www.openra.net/, 2017.
"Pumpkin Studios", Warzone 2100: https://wz2100.net/, 1999.
"RoboCup Simulation League", https://en.wikipedia.org/wiki/RoboCup_Simulation_League, 2013.
Wu, et al., "Training Agent for First-Person Shooter Game With Actor-Critic Curriculum Learning", International Conference on Learning Representations (ICLR), 2017, 10 pages.
Andrew, et al., "Rectifier nonlinearities improve neural 325 network acoustic models", In Proceedings of ICML, vol. 30, 2013, 6 pages.
Anonymous Author, "ELF: An Extensive, Lightweight and Flexible Research Platform for Real-time Strategy Games", Submitted to 31th Conference on Neural Information Processing Systems, Jul. 4, 2017, 10 pages.
Babaeizadeh, et al., "Re-Inforcement Learning Through Asynchronous Advantage Actor-Critic on a gpu", International Conference on Learning Representations (ICLR), 2017, 10 pages.
Beattie, et al., "DeepMind Lab", Dec. 14, 2016, 11 pages.
Bellemare, et al., "The Arcade Learning Environment: An Evaluation Platform for General Agents", Journal of Artificial Intelligence Research 47, Jun. 21, 2013, pp. 253-279.
Bhonker, et al., "Playing SNES in the Retro Learning Environment", 2016, 11 pages.
Brockman, et al., "OpenAI Gym", Jun. 5, 2016, 4 pages.
Browne, et al., "A Survey of Monte Carlo Tree Search Methods", IEEE Transactions on Computational Intelligence and AI in Games, vol. 4, No. 1, Mar. 1, 2012, pp. 1-43.
Buro, et al., "On the development of a free rts game engine", In Game-OnNA Conference, 2005, pp. 23-27.
Chaslot, et al., "Parallel Monte-Carlo Tree Search", In International Conference on Computers and Games, 2008, pp. 60-71.
Ioffe, et al., "Batch Normalization: Accelerating Deep Network Training by Reducing Internal Covariate Shift", ICML, Mar. 2, 2015, 11 pages.
Johansson, et al., "Spring", Spring: https://springrts.com/, 2008.
Johnson, et al., "The Malmo Platform for Artificial Intelligence Experimentation", Proceedings of the Twenty-Fifth International Joint Conference on Artificial Intelligence (IJCAI-16), 2016, pp. 4246-4247.
Kempka, et al., "ViZDoom: A Doom-based AI Research Platform for Visual Reinforcement Learning", Institute of Computing Science, Poznan University of Technology, Sep. 20, 2016, 8 pages.
Lample, "Playing FPS Games with Deep Reinforcement Learning", School of Computer Science, Sep. 18, 2016, 7 pages.
Mirowski, "Learning to Navigate in Complex Environments", Published as a conference paper at ICLR, 2017, 5 pages.
Mnih, et al., "Asynchronous Methods for Deep Reinforcement Learning", 2016, 10 pages.
Nair, et al., "Massively Parallel Methods for Deep Reinforcement Learning", Jul. 16, 2015, 14 pages.
Ontanon, et al., "The Combinatorial Multi-Armed Bandit Problem and Its Application to Real-Time Strategy Games", Proceedings of the Ninth AAAI Conference on Artificial Intelligence and Interactive Digital Entertainment, 2013, pp. 58-64.
Peng, et al., "Multiagent Bidirectionally-Coordinated Nets Emergence of Human-level Coordination in Learning to Play StarCraft Combat Games", Sep. 14, 2017, 10 pages.
Richard, et al., "Policy Gradient Methods for Reinforcement Learning with Function Approximation", In (NIPS) Advances in Neural Information Processing Systems 12, vol. 99, 1999, pp. 1057-1063.
Schulman, et al., "Trust Region Policy Optimization", Apr. 20, 2017, 16 pages.
Silver, et al., "Mastering the Game of Go With Deep Neural Networks and Tree Search", Nature, Jan. 28, 2016, pp. 484-489.
Sukhbaatar, et al., "Mazebase: A Sandbox for Learning From Games", Under review as a conference paper at ICLR, Jan. 7, 2016, 11 pages.
Synnaeve, et al., "TorchCraft: a Library for Machine Learning Research on Real-Time Strategy Games", Nov. 7, 2016, 6 pages.
Tian, et al., "Better Computer Go Player With Neural Network and Long-Term Prediction", Published as a conference paper at ICLR 2016, Feb. 29, 2016, 10 pages.
Usunier, et al., "Episodic Exploration for Deep Deterministic Policies: An Application to Starcraft Micromanagement Tasks", ICLR, 2017, 16 pages.

* cited by examiner

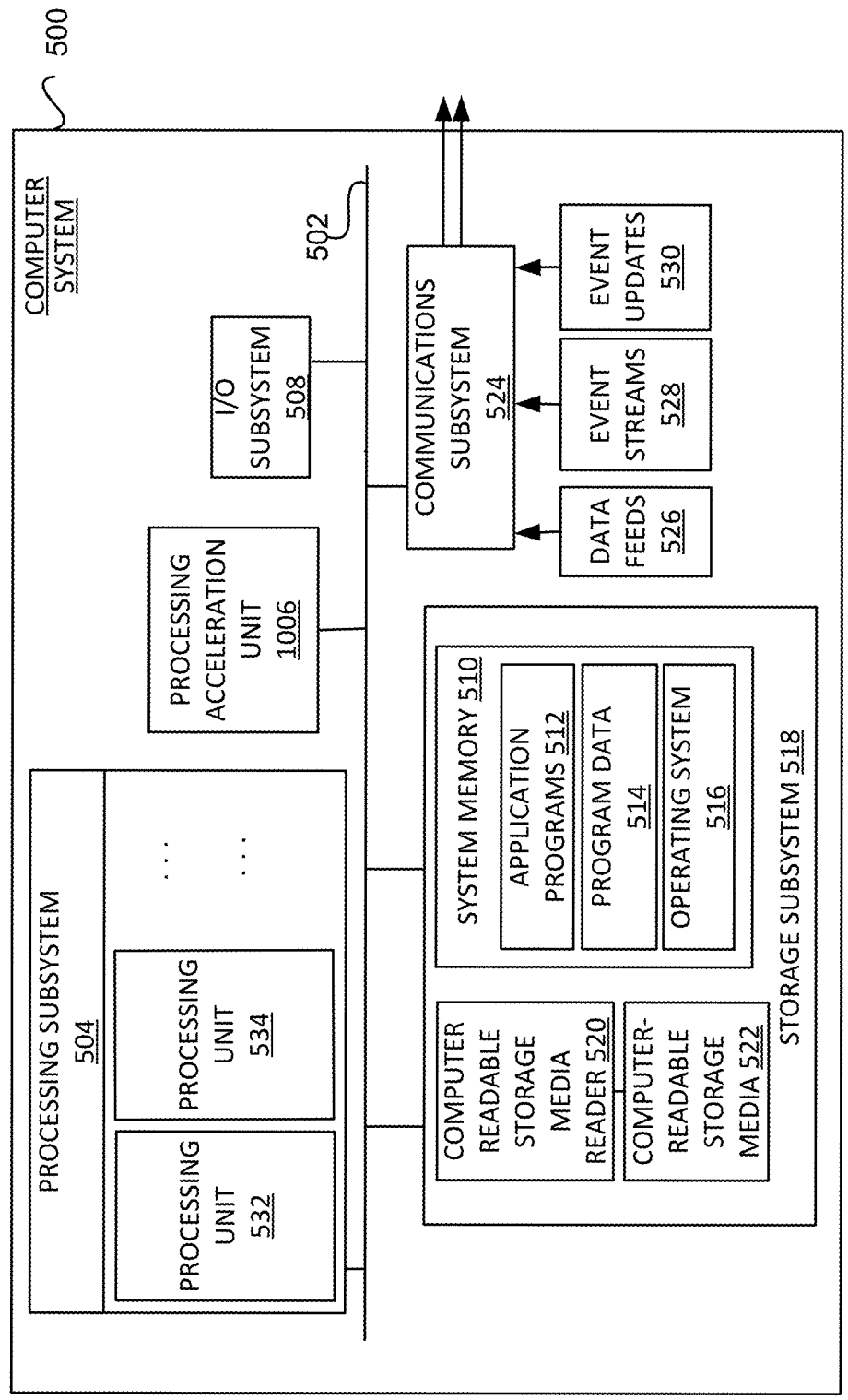

US 10,387,161 B2

TECHNIQUES FOR CAPTURING STATE INFORMATION AND PERFORMING ACTIONS FOR THREADS IN A MULTI-THREADED COMPUTING ENVIRONMENT

BACKGROUND

Computing environments may try to capture information (e.g., state information) about execution of one or more instances of instructions. Instructions may define a state-based game or program code. The information may be captured to implemented rule-based and learning techniques for facilitate decisions for interaction with execution of the instructions. Each instance of a set of instructions may be executed in a different process to utilize the availability of computing resources. In a computing environment implemented to execute thousands of instances of any given set of instructions, a significant amount of computing resources may be utilized to access memory utilized for each process to obtain information about execution of those instances. The challenge of accessing memory across different processes is prohibitively expensive and may impact (e.g., reduce) processing efficiency, requiring more time and computing resources to access information from memory for each process. As a result of the challenges in the computing environments for obtaining information to implement rule-based and learning techniques, the computing environments may not be adaptive to support use of the information captured, such as for accurate and efficient development of rule-based and learning models for execution of any given instructions.

SUMMARY

The present disclosure relates generally to techniques (e.g., systems, methods and computer-readable medium) for implementing an extensible, light-weight, flexible (ELF) processing platform that can efficiently capture state information from multiple threads during execution of instructions (e.g., an instance of a game). The captured state information may be useful to enable the ELF platform to determine subsequent actions to perform on a thread each various states of execution.

To efficiently capture state information for execution of multiple sets of instructions across multiple threads, the threads may be executed in a single process. The ELF processing platform supports execution of multiple threads in a single process for parallel execution of multiple instances of the same or different program code or games. The platform is designed to enable one or more memory spaces to be shared across the threads to enable efficient retrieval and access of information about the threads during different states of execution. By reducing the processing of retrieving state information for multiple threads, efficient computing performance may be achieved to enable fast and flexible use of the state information for purposes such as implementing learning techniques (e.g. reinforcement learning) to train model for determining actions. Existing processing environments may be challenged with executing instructions in multiple processes, such that memory and processing must be coordinated to obtain state information for execution by multiple threads. Such environments may limit the ability for execution of multiple instances of different program code or games. The ELF platform supports a callable interface and shared memory space for a process to minimize processing for the efficient capture state information across multiple instances of instructions.

Upon capturing the state information, one or more threads may be executed in the ELF platform to compute one or more actions to perform at any state of execution by each of those threads. The threads can easily access the state information from a shared memory space and use the state information to implement rule-based and/or learning-based techniques for determining subsequent execution for the threads. As threads execute instructions, state information may be collected periodically (e.g., using a batching technique) to build rules and/or models for learning techniques.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

In at least one embodiment, a computer-implemented method may be implemented the capture state information for execution of instructions by threads and to determine actions for the threads to perform with respect to the states during execution of those instructions. An ELF platform may have one or more processes, each of which may be executing multiple threads, which share a common memory space within that process. Each thread may be executing an instance of a set of instructions. The set of instructions executed by each thread may be the same or different. The set of instructions may define a program or a game, which had multiple states for execution. Each thread may store state information about a state of execution of an instance of instructions executed by that thread. To efficiently capture the state information for multiple threads, an action thread, which is executing in the same process as the threads, can access the state information the shared memory space. Some or all threads may be identified upon changes in states. To minimize communication of data within the process, a signal may be provided to the action thread to indicate the threads for which state information is to be gathered.

In the method, upon receiving the signal, the action thread may access the state information from the common memory space for the threads identified in the signal. The state information may be read from the memory space for the threads identified in the signal. For each thread identified by the signal, data may be computed with respect to the state information. The data may include an action for the thread to perform at the current state of execution indicated by the state information. A model may be used by the action thread to compute the data including the actions. The model may be trained using historical data related to previously execution of the instructions for which the data is computed. The same or a different model may be used to compute the data for other threads. A model may be trained with respect to a particular set of instructions (e.g., a game). In some embodiments, a model may be trained using a reinforcement learning technique.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 5 illustrates an example of a computer system that may be used to implement certain embodiments described herein.

DETAILED DESCRIPTION

Figure 1:
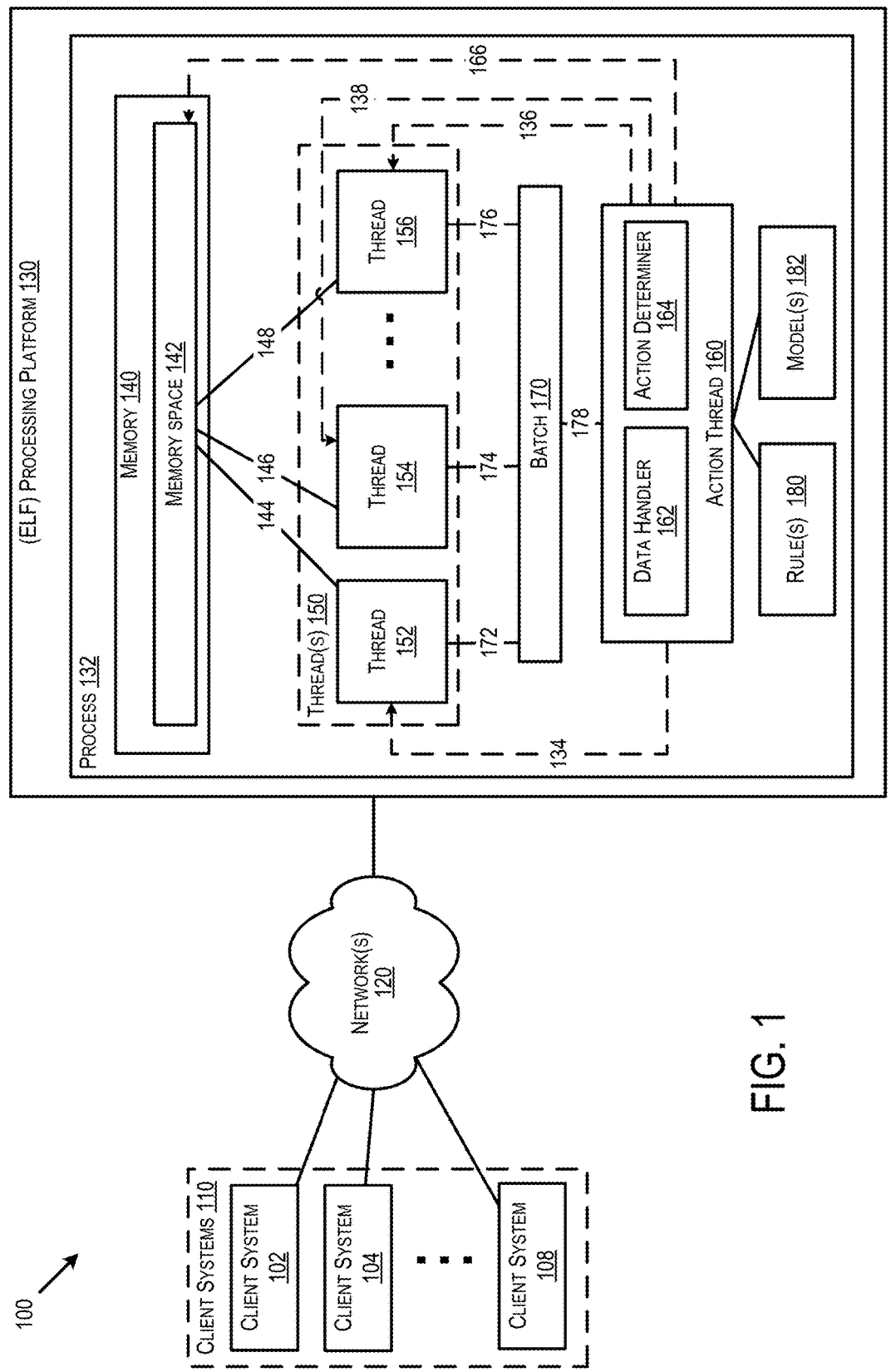
FIG. 1 is a high-level overview of a system for capturing state information and determining actions to perform by threads for execution states according to some embodiments.

The present disclosure relates generally to techniques for implementing an extensible, light-weight, flexible (ELF) processing platform that can efficiently capture state information from multiple threads during execution of instructions (e.g., an instance of a game). The captured state information may be useful to enable the ELF platform to determine subsequent actions to perform on a thread each various states of execution.

To efficiently capture state information for execution of multiple sets of instructions across multiple threads, the threads may be executed in a single process. The ELF processing platform supports execution of multiple threads in a single process for parallel execution of multiple instances of the same or different program code or games. The platform is designed to enable one or more memory spaces to be shared across the threads to enable efficient retrieval and access of information about the threads during different states of execution. By reducing the processing of retrieving state information for multiple threads, efficient computing performance may be achieved to enable fast and flexible use of the state information for purposes such as implementing learning techniques (e.g. reinforcement learning) to train model for determining actions. Existing processing environments may be challenged with executing instructions in multiple processes, such that memory and processing must be coordinated to obtain state information for execution by multiple threads. Such environments may limit the ability for execution of multiple instances of different program code or games. The ELF platform supports a callable interface and shared memory space for a process to minimize processing for the efficient capture state information across multiple instances of instructions.

Upon capturing the state information, one or more threads may be executed in the ELF platform to compute one or more actions to perform at any state of execution by each of those threads. The threads can easily access the state information from a shared memory space and use the state information to implement rule-based and/or learning-based techniques for determining subsequent execution for the threads. As threads execute instructions, state information may be collected periodically (e.g., using a batching technique) to build rules and/or models for learning techniques.

In at least one embodiment, a computer-implemented method may be implemented the capture state information for execution of instructions by threads and to determine actions for the threads to perform with respect to the states during execution of those instructions. An ELF platform may have one or more processes, each of which may be executing multiple threads, which share a common memory space within that process. Each thread may be executing an instance of a set of instructions. The set of instructions executed by each thread may be the same or different. The set of instructions may define a program or a game, which had multiple states for execution. Each thread may store state information about a state of execution of an instance of instructions executed by that thread. To efficiently capture the state information for multiple threads, an action thread executing in the same process as the threads can access the state information the shared memory space. Some or all threads may be identified upon changes in states. To minimize communication of data within the process, a signal may be provided to the action thread to indicate the threads for which state information is to be gathered.

In the method, upon receiving the signal, the action thread may access the state information from the common memory space for the threads identified in the signal. The state information may be read from the memory space for the threads identified in the signal. For each thread identified by the signal, data may be computed with respect to the state information. The data may include an action for the thread to perform at the current state of execution indicated by the state information. A model may be used by the action thread to compute the data including the actions. The model may be trained using historical data related to previously execution of the instructions for which the data is computed. The same or a different model may be used to compute the data for other threads. A model may be trained with respect to a particular set of instructions (e.g., a game). In some embodiments, a model may be trained using a reinforcement learning technique.

I. High-Level View of "ELF" Processing Platform

FIG. 1 illustrates a high-level overview of a system 100 for capturing state information and performing actions for threads in a multi-threaded computing environment according to some embodiments. One or more of the below-described techniques may be implemented in or involve one or more computer systems.

System 100 may include client system 102, client system 104, . . . client system 108 (collectively "client systems" or "clients" 110) and processing platform 130 of FIG. 1. Client systems 110 may be operated by one or more users to utilize processing platform 130.

Each of client systems 110 and processing platform 130 may be implemented using a computer system, which may comprise one or more computers and/or servers which may be general purpose computers, specialized server computers (including, by way of example, personal computer (PC) servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 may be included in or implemented with a Facebook® product or service provided by Facebook, Inc. In various embodiments, processing platform 130 may be configured to run one or more services described in the foregoing disclosure.

In some embodiments, processing platform 130 may be implemented as an enterprise computing system or a cloud computing system comprising one or more computers and/or servers that may include those described above. Each of client systems 110 and processing platform 130 may include several subsystems and/or modules, including some, which may not be shown. Each of client systems 110 and processing platform 130 may have more or fewer subsystems and/or modules than shown in the figure, may combine two or more subsystems and/or modules, or may have a different configuration or arrangement of subsystems and/or modules. Subsystems and modules in each of client systems 110 and processing platform 130 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

Client systems 110 and processing platform 130 may be communicatively connected via one or more communication networks 120. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Processing platform 130 may execute multiple instances of a set of instructions (e.g., a game) for client systems 110. Execution of an instance of instructions may be initiated and controlled from a client system. Processing platform 130 may perform processing to capture information (e.g., state information) for execution of each instance of a set of instructions. Processing platform 130 may compute data (e.g., an action) at a state during execution of the instance. In some embodiments, processing platform 130 may be implemented in each of client systems 110 to execute multiple instances of a set of instructions. Client systems 110 may be operated to access services provided by processing platform 130. A service provided to a client system may include performing any of the operations described herein as being performed at processing platform 130 for the client system. For example, processing platform 130 may provide a service to execute multiple instances of a set of instructions (e.g., a game) for client systems 110, obtain information for execution of those instances, compute one or more actions at a state of execution of each instance, and perform the one or more actions at the state of execution for each instance.

Processing platform 130 can be an extensive, lightweight, and flexible (ELF) platform for executing instances of instructions, such as instances of a game, to capture state-based information. Existing computing environments are not able to capture information in the manner of processing platform 130 implemented as an ELF platform. As an ELF platform, processing platform 130 may be more capable to implement learning techniques for execution of those instances. Processing platform 130 may support capturing information and computing actions for different types of instructions that are state driven. Based on applying one or more techniques for state-based decision making, processing platform 130 may compute an action for a state during execution of an instance of a set of instructions. Processing platform 130 may be ideal for implementing an environment for one or more games to support learning research.

Processing platform 130 may be an extensive platform for the ability to capture many diverse aspects of the real world, such as rich dynamics, partial information, delayed/long-term rewards, and concurrent actions with different granularity. The ability to capture information from multiple instances of instructions executing in a single process may enable processing platform 130 to efficiently increase the potential for learning based techniques to generalize to diverse real-world scenarios. By capturing state information from executing multiple instances of a set of instructions in a single process, processing platform 130 is fast and efficient for generating samples hundreds or thousands of times faster than real-time with minimal compute resources (e.g., a single machine). For example, processing platform 130 may enable a game to run at hundreds of thousands of frames per second (FPS) or more on a computing system with several core processors. Such performance may be realized as greater than existing platforms by an order of magnitude. A lightweight and efficient platform helps accelerate research based on learning techniques, which are heavily data-dependent. As an ELF platform, processing platform 130 may enable a learning model to be trained to implement a full-game bot against built-in artificial intelligence systems. In some instances, an ELF platform may enable training to be accomplished in only one day using multiple computer processors (e.g., 6 central processing units (CPUs) and 1 general processing unit (GPU)).

Processing platform 130 is easily configurable or customizable at different levels, including rich choices of environment content, easy manipulation of execution parameters, accessibility of internal variables, and flexibility of training architectures. Processing platform 130 enables one or more algorithms to be implemented for learning techniques to compute actions for state-based execution. Existing platforms may be challenged to adapt in the manner of a processing platform 130 implemented as ELF platform to modern applications or games that are extremely realistic. Existing platforms may not be customizable and may demand significant computing resources. Existing platforms may not be able to consider simulation concurrency, and thus have limited flexibility with different learning techniques. An ELF platform may permit for both parameter changes and addition of new sets of instructions (e.g., new games) for flexible integration into the computing environment, with an emphasis on concurrent simulations.

Processing platform 130 may be implemented to operate as an ELF platform by executing multiple threads in a single process. Processing platform 130 may include one or more processes (e.g., process 132) executing on the processing platform. A process can be a collection of instructions (e.g., code), memory, data and other resources. For example, a process may be an instance of code that is being executed. The process may be assigned memory 140, which is a portion of memory in the processing platform 130. Processing platform 130 may implement one or more processes for implementing techniques disclosed herein for capturing information for execution of one or more instances of instructions, computing data identifying an action based on the information, and performing the action(s).

Within the scope of a process, one or more threads may be executed. For example, thread 152, thread 154, ... thread 156 (collectively referred to as "threads" 150) may be executed within process 132. The threads may be executed in parallel and concurrently within the same process. Each thread may execute the same or different sets of instructions. A set of instructions may define a program or a game that operates according to states. A game may be interactive such that an action is performed at various states. Each of the threads may execute an instance of a set of instructions as a simulation to build training data on the set of instructions. Examples of games include, without limitation, Capture the Flag, Tower Defense, StarCraft®, chess, checkers, Grand Theft Auto®, and MazeBase. An instance of a set of instructions may execute an action at different states. A value may further define the action performed at a state. For example, an action may indicate a direction in which to move in a game at a state, and the value may indicate an amount of move in the direction.

Executing a set of instructions may include executing an instance of the set of instructions. Multiple threads may be executed for a single set of instructions to achieve performance benefits of capturing information based on executing multiple instances of the set of instructions. Executing a set of instructions may include creating an instance of the set of instructions and executing the instance. Each of threads 150 may have access to a memory space 142 (e.g., a common memory space) in memory 140. The memory space 142 may be where instructions are stored as well as other data including information (e.g., state information) for execution of the instructions for each of the threads 150.

FIG. 1 illustrates an example of how threads may execute one or more sets of instructions to capture information about execution of those instructions. In one example, the captured information may be used to determine a next action to perform for each thread. Processing platform 130 may initiate a plurality of threads (e.g., threads 150) in a process (e.g., process 132). Some of the plurality of threads may execute in the process 132. Each of threads may be executing a set of instructions, which may be the same or different for at least some of the threads. Each thread may execute an instance of a set of instructions. For purposes of illustration, an instance of a set of instructions may be described as an instance of a game which is performed upon execution of the instance.

In some embodiments, a set of instructions may be stored in memory 140 shared by the threads. Threads may share a common memory space 142. Memory space 142 may be a location where data is read and written for execution of each of the threads. Each thread may access a different area in the memory space. Each area in the memory space may be associated with a distinct address in memory 140.

For a thread executing an instance of a set of instructions, information may be generated for the thread. The information may be generated for each state encountered in the execution of the instance of the set of instructions. For example, state information may be generated for each state encountered. The state information may include an action performed and one or more values related to execution of the action leading to that state. The state information may include the next actions that can be performed at the state including one or more values related to each of the next actions. A thread executing an instance may store the information as data at memory space 142 for the thread. The information may be different for execution of each instance of a set of instructions. For example, thread 152 may store information 144 at memory space 142 for a state during execution of an instance of a set of instructions, thread 154 may store information 146 for a state during execution of an instance of a set of instructions, and thread 156 may store information 148 for a state during execution of an instance of a set of instructions. For example, the information about a state of execution of a game may correspond to a position within the game. The position may include a location, coordinates, and/or a level.

In at least one embodiment, one or more additional threads (e.g., action thread 170) may be executed for perform operations to capture information for each thread based one executing an instance of a set of instructions at each state. Each of threads 150 may provide the information directly to action thread 170 and action thread 170 may access the information from memory space 142, or a combination thereof. To minimize processing overhead for aggregating information generated for multiple threads, a set of instructions (e.g., a batch job) may be executed to provide the action thread with the information or an indication of the information to aggregate. For purposes of efficiency and to capture information at specific states (e.g., each state), action thread may capture information from a subset of threads 150. The information may be captured according to a schedule (e.g., periodically). Batch 170 may determine the threads for which information is to be captured and may provide an identification of those threads to the action thread. Batch 170 may be a thread that executes a set of instructions. Batch can be a set of instructions (e.g., a batch job) that is executed by process 132. Batch 170 identifies and informs the action thread about threads for which to capture information for execution of instructions. In at least one embodiment, batch 170 may provide a signal 178 to action thread 170. The signal may be provided as a communication or a stored as a value in memory space 142, either of which signals action thread 160 to perform processing to capture the information.

Information (e.g., state information) may be aggregated for each thread in the shared memory space 142. Information may be captured for a variety of purposes. In at least one embodiment, information may be captured to determine a next action to perform a state in executing an instance of a set of instructions. By being in the same process, information generated for different threads for execution of different instances of instructions may be easily accessed from a shared memory space accessible from within the same process. Processing performance may be improved by reducing the processing to access such information from different memories across multiple processes. The information may be provided by each thread to batch 170 or may indicate to batch 170 when to aggregate the information for threads. For example, each of thread 152, thread 154, and thread 156 may send a signal, either via communication or storage of data 172, 174, and 176, respectively, to batch 170 to indicate when information at a new state during execution for each of those threads. Batch 170, in turn, may send a signal 178 to action thread 160 as explained above.

Action thread 160 may include a subsystem/module data handler 162 that performs operations to access data to capture information during execution of instances of a set of instructions in each of some or all threads 150. Action thread 160 may receive signal 178 from batch 170. In one example, signal 178 may include an identifier of each of thread 152 and thread 154 as having generated information during execution in each of the threads.

Data handler 162 may be initiated to operate by action thread 160 based on signal 178. Action thread 160 may perform operations for each thread identified by signal 178.

Data handler 162 may maintain a data including information about the states during execution of each instance of instructions in each of threads 150. For example, data handler 162 may implement one or more data structures (e.g., a linked list or an array) to store state information for each distinct set of instructions, in particular each thread executing an instance of a set of instructions. Having stored a prior state, data handler 162 can determine a last state of execution after which to update information obtained for each thread based on signal 178. In one embodiment, using the identifier of each thread, data handler 162 may access memory space 162 to identify the information stored with respect to a thread. Data handler 162 may read, from memory space 142, state information for a first thread (e.g., thread 152) identified by signal. Data handler 162 may read, from memory space 142, state information for a second thread (e.g., thread 154) identified by signal 178. Memory 140 may be shared by threads executing in process 132. The information read from memory space 142 may be provided to action determiner 164. For example, data handler 162 may communicate the information to action determiner 164.

Action determiner 164 can determine one or more actions for each thread to perform at a current state of execution. For any thread identified as executing, action determiner 164 can compute data that the thread can use for determining execution at a current state of execution with respect to an instance of a set of instructions. The data may indicate an action to be performed by the thread. The data may be computed based on state information obtained by data handler 162. At any state of execution, action determiner 164 can implement techniques to compute one or more next actions at the state. In one example, at a state of execution in a level of an instance of a game executing on a thread, action determiner 164 may determine one or more next actions at the state in the level. The action(s) may be determined as a next best action for proceeding at a state of execution for an instance of a set of instructions.

In at least one embodiment, the next action can be determined based on one or more rules (e.g., rules 180) for executing the set of instructions. The rule(s) may be based on history and/or patterns for execution. The rule(s) may be considered for all instances of a set of instructions. The rules may be adjusted based on execution of instances of the set of instructions. Rule(s) may be configured on a per user basis or with respect to a group of users. The rule(s) may be defined according to a state model, which may be hierarchical from a starting state in execution of the set of instructions. Based on a state of execution of an instance of instructions, the rule(s) may be used to determine a next action at the state. A next action may be an operation to perform that the current state of execution.

In at least one embodiment, the next action can be determined based on one or more model(s) 182. The model(s) may be specific to each distinct set of instructions (e.g., a game). Model(s) may be user specific or a group of users. The model(s) may be generated based on supervised learning techniques, unsupervised learning techniques, or a combination thereof. Examples of learning techniques include, without limitation, machine learning and reinforcement learning. The model(s) may be trained based on historical data related to one or more users. A model may be defined as a learned state model, which may be hierarchical from a starting state in execution of the set of instructions. Based on a state of execution of an instance of instructions, the model(s) may be used to determine a next action at the state. A next action may be an operation to perform that the current state of execution. The model(s) may be adapted as actions are executed based on the outcome of those actions.

For each thread identified in signal 178, action determiner 164 may compute data identifying a next action for the thread(s). The action may be different for each thread, even if each thread is executing a different instance of the same set of instructions since each thread may execute an instance differently. Each thread may be at a different state of execution when identified by signal 178. The data may include a value to the action. For example, the value may be related to movement (e.g., a measure of movement) when performing the action.

Upon computing data for all or some of threads 150 identified in signal 178, the computed data for each of those threads may be made accessible to those threads. Action determiner 164 may communicate data computed for a thread to that thread. For example, action determiner 164 can send, to each of threads 152, 154, 156, a communication 134, 136, 138, respectively, including data computed for each of those threads. Data may be communicated as computed for threads identified in signal 178. In some embodiments, the data may be stored in memory space 142 where it may be accessible by each thread for which the data is computed.

Each thread that is provided with computed data receives the data, whether by communication or accessibility in memory 140. Each thread may implement an action indicated in computed data for that thread provided by action thread 160. An action may be implemented by executing one or more instructions in the set of instructions at a state of execution for which the data is computed. In some embodiments, a thread may automatically execute one or more instructions in the set of instructions at a state of execution based on computed data that is stored in a particular location in memory space 142.

The operations described as being performed within processing platform 130 may be repeated for threads at those threads execute a set of instructions, performing an action at one or more states during execution. By implementing techniques disclosed herein with reference to system 100, processing platform 130 may enable one or more sets of instructions to be execute to facilitate capture of information from multiple threads, and computing actions for one or more stages of execution for each of those threads, the actions of which are performed by each of those threads. The operations may cease upon completion of executing an instance of a set of instructions. One or more threads may be executed to further execute new instances of instructions. The process of capturing information from threads may facilitate creation, management, and development of rule(s) and model(s) for determining actions to perform at each of the threads during execution of an instance of any a set of instructions.

In certain embodiments, processing platform 130 may also provide other services or software applications can include non-virtual and virtual environments. In some embodiments, these services may be offered as web-based or cloud services or under Software as a Service (SaaS) model to the users of client systems 110. The services may be provided by processing platform 130 via a SaaS platform. The SaaS platform may be configured to provide services that fall under the SaaS category. The SaaS platform may manage and control the underlying software and infrastructure for providing the SaaS services. Various different SaaS services may be provided, including services provided based on operations performed by processing platform 130 as disclosed herein.

Each of client systems 110 and processing platform 130 may include at least one memory, one or more processing units (or processor(s)), and storage. For example, processing platform 130 may include memory 140, at least a portion of which may be assigned to process 130 executing on the processing platform 130. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Processing platform 130 may also include or be coupled to one or more data stores, which may store data for process 130 and/or any of threads 150 within the scope of process 130. For example, each of model(s) 182 and rule(s) 180 may be in the same or different data stores. Action thread 160 may include or utilize one or more data stores for managing data for operations performed by data handler 162 and action determiner 164. Each data store may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

II. Detailed View of "ELF" Processing Platform

Figure 2:
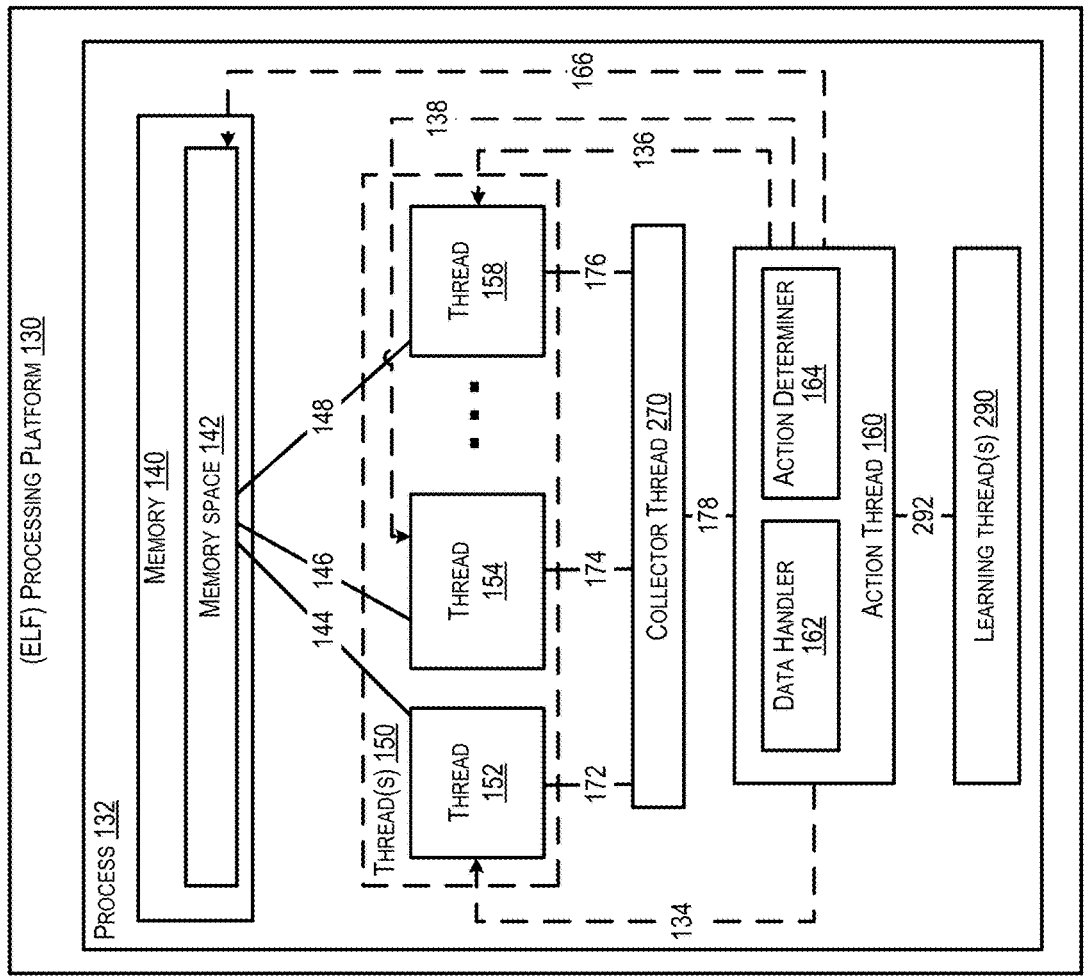
FIGS. 2 and 3 are detailed block diagrams of a system for capturing state information and determining actions to perform by threads for execution states according to some embodiments.

FIG. 2 illustrates a detailed block diagram 200 of an ELF processing platform (e.g. processing platform 130). In some embodiments, processing platform 130 may include one or more threads, such as thread 270 ("collector thread") that executed in a single process (e.g., process 132) with other threads executing instructions. Collector thread 270 may be implemented to execute one or more instructions (e.g., a program) that runs in the background to collect state information from threads as a new/different state of execution is encountered by each thread. Collector thread 270 may monitor memory space to identify a change in state of execution for each thread and/or may receive notification from a thread about a change in state of execution. Memory space 142 may be configured to store instructions for execution by each thread and data for the thread. Threads executed in process 232 may execute instructions (e.g., program or game) stored in memory space 142. Data for execution of instructions may be stored in memory space 142 where the data may be accessed across threads in a single process. Collector thread 270 may perform operations described with reference to batch 170 to batch threads for which state information is to be provided to action thread 160. Collector thread 270 may generate and send signal 178 to action thread 160.

Process 132 may include one or more threads 290 ("learning threads") executing instructions for training one or more model(s) for determining actions for state-based programs or games. Each of the learning threads 290 may be implementing one or more methods or algorithms for training a model to determine actions for executing the programs or games. As discussed further below, one or more learning techniques may be applied to each program or game. Learning techniques may be added, modified, or replaced to adjust training of models. Learning threads 290 may be implemented in optimizer 390 of FIG. 3 discussed below.

III. Example of "ELF" Processing Platform

Figure 3:
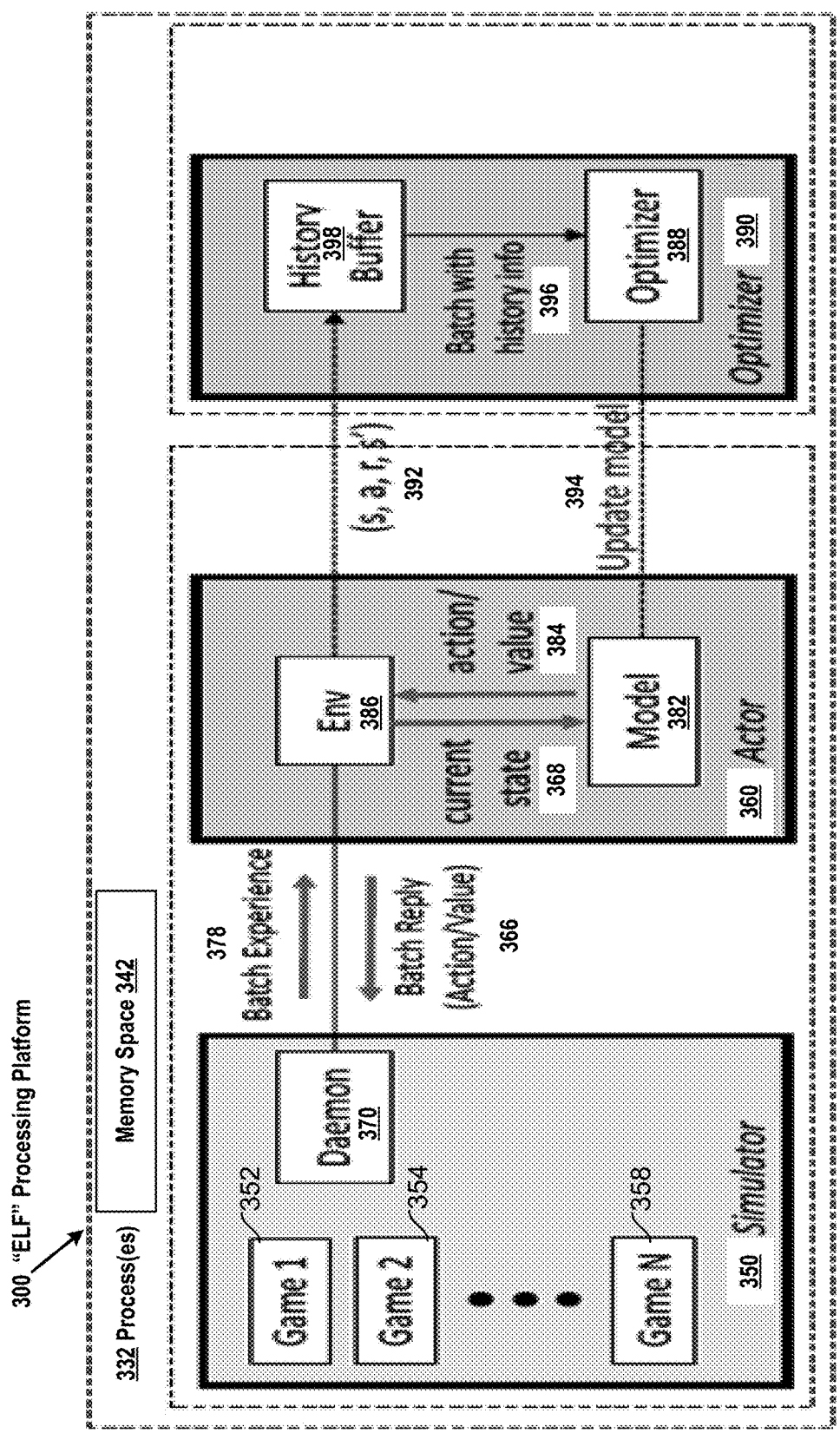

FIG. 3 illustrates a detailed block diagram of a system 300 for capturing state information and determining actions to perform by threads for execution states according to some embodiments. Specifically, system 300 enables efficient capture of state information during execution of games that are played through simulation. The simulation of the games is driven by one or more learning techniques that provides a best action for playing the game. The state information may be captured at each state of execution to enable one or more learning techniques to be implemented to improve a learning model.

System 300 shown in FIG. 3 is one embodiment of an ELF processing platform, such as processing platform 130 of FIG. 1. In the example shown in FIG. 3, processing platform 300 may include a single process 332. Process 332 may include multiple threads to implement multiple execution environments.

A simulator computing environment 350 ("simulator") may be implemented with multiple threads in process 332. The threads in simulator may include threads executing games may include, for example, "game 1" executing by a thread 352, "game 2" executing by a thread 354, . . . "game N" executing by a thread 356. Each of the games may be different instances of the same game, instances of different games, or combinations thereof. Each of threads 352, 354, and 356 may correspond to thread 152, thread 154, and thread 156, respectively. Simulator 350 may be implemented using C++ programming language, such that games are executed on threads implemented using C++. Some learning techniques such as reinforcement learning may demand and benefit from parallelism of execution to improve diversity of experiences captured during simulation of games. Implementing a simulator with C++ enhances parallelism on in processing platform 300 when implemented using multi-core processing units. C++ may be beneficial for simulation to achieve parallelism between multiple threads, which enhances simulation acceleration for building a learning model to simulate games.

Simulator may include a thread 370 executing a program implementing a daemon to facilitate capture of state information from the threads executing games. Daemon 370 may be implemented to perform operations described with reference to batch 170 of FIG. 1. Daemon can execute in the background of simulator to monitor status of execution of threads 352, 254, 356. Thread 370 may determine a batch of threads to be identified for information capture. Daemon may execute a batch job to communicate a signal 378 about each of the threads that are identified as reaching a different state of execution in a simulation of a game. Signal 378 may be implemented as described with reference to signal 178 of FIG. 1. Signal 378 may include information identifying each of the threads for which to obtain state information. The state information may include experience information related to a state of execution. Experience information may include an environment at a state of execution, a position in a game at a state of execution, a level of the game for the position, a time value, one or more variables related to execution of the game, or other information related to execution of the game with respect to a state.

Process 332 may be designated memory, which includes a memory space 342 that is shared within process 332. Memory space 342 may be shared by threads in process 332. Memory space 342 may be implemented as described with reference to memory space 142 of FIG. 1. Daemon may monitor status of execution of games for threads based on information stored in memory space 342. The identifiers in signal 378 may be used to identify state information associated with those threads in memory space 342.

Process 332 may implement an action environment 360 ("actor") including one or more threads for execution of operations. Actor 360 may be implemented to perform operations described with reference to action thread 160 of FIG. 1. Actor 360 may include one or more threads (e.g., a thread 386) that provide a processing environment ("ENV") to capture state information, determining actions to perform in games that are simulated, and communicating the actions to simulator 350 to perform the actions. Thread 386, for example, may be implemented as described with reference to thread 160 of FIG. 1. Thread 386 may obtain a communication (e.g., signal 378) from daemon 370 of simulator 350. Actor 360 may implement one or more callable interfaces, such as a programming interface (e.g., a Python/C interface), that provides features for actor 360 to receive a communication from simulator 350 provided by daemon 370.

Thread 386 may access (e.g., retrieve) state information including experience information from memory space 342 for the threads identified in signal 378. Thread 386 may provide (e.g., in a single communication) the accessed state information 368 ("current state") to a model (e.g., model 382) to implement one or more learning techniques. Model 382 may be implemented as described with reference to model(s) 182 of FIG. 1. Actor 360 may utilize model 382 to generate data 384 (e.g., data including an action and a value) for each thread identified with respect to current state 382. The data may be based on computing data corresponding to an action to perform at a current state of execution with respect to each thread. The data may be computed to include one or more values with respect to that action. The value(s) may correspond to an attribute related to the action, such a direction, an offset, a distance, or the like. Data 384 may be provided or returned to thread 386 based on application of model 382.

Thread 386 may send a response to daemon 370 to provide data generated by actor 360 using model 382. The data may be provided with an identifier of the thread to which the data is to be provided. Daemon 370 may provide the data directly to a thread or may store the data in memory space 342, where the thread can access the data or be informed to take action based on the data. The thread corresponding to a game for which data is provided may perform an action indicated in the data for the game. The value(s) accompanying the action may be set at the state of execution when the action is performed.

In at least one embodiment, model may be implemented using one or more learning techniques. Model 382 may be implemented as a neural network-based model. In at least one implementation, model 382 may be implemented as an Asynchronous Advantageous Actor-Critic (A3C) model. Model 382 may be trained using reinforcement learning techniques, including factors such as frame skip, temporal horizon, network structure, curriculum training, etc. In some implementations, using Leaky ReLU and Batch Normalization coupled with long-horizon training and progressive curriculum may outperform rule-based artificial intelligence.

Actor 360 may communicate with optimizer 390 to during a training phase. Optimizer 390 may be implemented within process 332 or a separate process for adaptability within ELF processing platform 300. Optimizer 390 may be implemented by one or more threads 388. During training, thread 386 may send state information including experience information to the optimizer 390 via inter-process communication. Thread 388 for optimizer 390 may store the state information in a history buffer 398 implemented as a local data store. Thread 388 may batch 396 state information for multiple threads to update 394 model 382. Model 382 may be updated locally in optimizer 390 and then sent back asynchronously to actor 360.

Optimizer 390 may be implemented using Python programming language, such as a programming package PyTorch. ELF processing platform 300 is resilient to changes in the topology of the environment-actor communication used for training, thanks to its hybrid framework implemented using multiple languages such as C++ and Python. Optimizer 390 may be implemented with different models for training affording flexibility for switching topologies between environments and actors in games. Processing platform 300 may be implemented such that games may be assigned to one or more training models. Assignment to training models may include one-to-one, many-to-one and one to-many mappings. In a one-to-one mapping, a single model can be assigned to each environment (e.g., distinct game) in which each actor (e.g., actor 360) follows and updates its own copy of the model. Multiple actors may be implemented, each for one or more specific games. Multiple games can be assigned to a single actor, where the actor can perform batched forward prediction to better utilize processing units. The learning techniques may include incorporating forward-planning methods (e.g., Monte-Carlo Tree Search (MCTS)) and Self-Play, in which at one time step, a single environment might emit multiple states processed by multiple actors, or one-to-many. By defining the actor and the experience/reply between simulator and actor, these different training configurations can be tested without substantial changes. In contrast, existing processing environments (e.g., OpenAI Gym and Universe) may wrap one game in one Python interface, which makes it cumbersome to change topologies. Parallelism may be implemented in C++ for processing platform 300, which aides in simulation acceleration. Processing platform 300 may provide a unified interface capable of simulating games written in a particular programming language (e.g., C or C++), including Atari® games, board games (e.g. Chess and Go), and physics engines. Processing platform 300 may support many different game types by implementation of a basic adaptor to facilitate execution by simulator 350. Games implemented in process platform 300 may be trained using raw pixel data or lower-dimensional internal game data. Internal game data may be important for research focusing on reasoning tasks rather than perceptual ones.

In some embodiments, optimizer 390 may be implemented as a reinforcement learning system. The Python programming language may be implemented to enable a flexible design that decouples reinforcement learning methods from models. Multiple baseline methods (e.g., A3C, Policy Gradient, Q-learning, Trust Region Policy Optimization, etc) can be implemented. In existing reinforcement learning environments, an interface is provided that supports only single game instances. Processing platform 300, through a combination of simulator 390 supporting parallelism along with optimizer implemented using Python may enable multiple different reinforcement learning techniques to be applied to multiple game instances. Process-level parallelism to execute instances of games in multiple processes introduces extra data exchange overhead between processes. In contrast, processing platform 300 improves these challenges by embedding parallelism through multi-threading in simulator 350 to better scale on multi-core processing units. This enables processing platform to train end-to-end a full-game bot against built-in artificial intelligence systems. Training may be accomplished in a reduced time (e.g., one day) using limited number of processing resources.

IV. Processes for Capturing State Information

Figure 4:
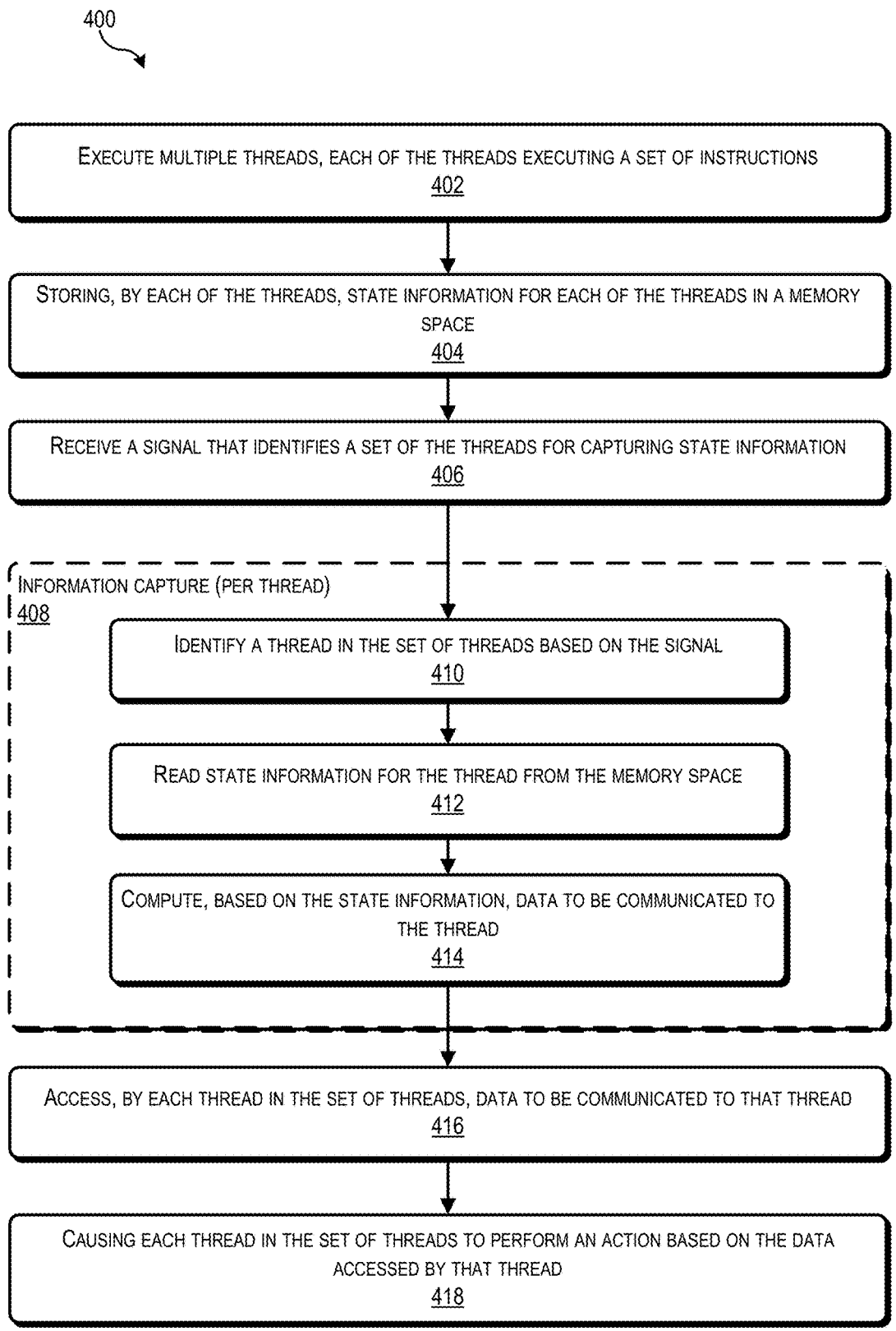
FIG. 4 is a flowchart depicting a process for capturing state information and performing actions for threads in a multi-threaded computing environment according to some embodiments.

FIG. 4 illustrates a flowchart 400 of a process for capturing state information and performing actions for threads executing instructions in a multi-threaded computing environment according to some embodiments.

In at least one embodiment, flowchart 400 may include blocks 402-418 that perform operations for capturing information from multiple threads and determine actions for those threads to perform based on the captured information.

At block 402, flowchart 400 include executing multiple threads in a computer system, such as processing platform 130. Many advantage of techniques disclosed herein may be realized when the operations described with reference to flowchart 400 are implemented in a single process. Each of the threads executed in a single process. The process, e.g., process 132, may be implemented in processing platform 130. Each of the threads may share a common memory space, such as memory space 142 of FIG. 1.

Each of the threads may be executed concurrently. A thread may execute a set of instructions. For example, a first thread may execute a first set of instructions and a second thread may execute a second set of instructions. To execute a set of instructions, an instance of the set of instructions may be executed. Multiple threads may execute different instances of the set of instructions. Following the previous example, the first set of instructions may be identical to the second set of instructions, such that the first thread executes the first set of instructions as an instance of the first set of instructions, and the second thread executes the second set of instructions as an instance of the second set of instructions. Some threads may execute different sets of instructions. For example, a first thread may execute a first set of instructions and a second thread may execute a second set of instructions, where the first set of instructions is different from the second set of instructions. Instances of any set of instructions may be initiated at a different time period. Each instance of a set of instructions may be at a different state of execution although initiated concurrently.

A set of instructions may define a program or a game, which may be implemented based on state-based execution. Executing a set of instructions may comprise executing an instance of those instructions. The instance of instructions may be an instance of a game. For example, executing a first set of instructions on a first thread may comprise executing an instance of a first game on the first thread, and executing a second set of instructions on a second thread may comprise executing an instance of a second game on the second thread. At each state, an action may be performed to determine subsequent instructions to execute from that state based on the action.

In some embodiments, one or more threads may be executed to facilitate capture of information. For example, the threads executed at block 402 may include an action thread. An action thread may execute in the same process that the threads executing instructions.

At block 404, each of the threads executing an instance of a set of instructions may store information for the thread. The information may be stored in a common memory space in memory that is allocated for a process in which the threads execute. The information may be stored by one or more instructions executed by the thread. The memory space may have one or more portions designated for each thread executing in a process.

The information stored in the memory space for a thread may be generated based on execution of an instance of a set of instructions. The information may be updated periodically based on execution of the instance by the thread. The information may include state information about a state of execution of the instance, such as an instruction and/or a result of executing an instruction. The state of execution in an instance of a game may correspond or include a position in the instance of the game. For example, a first thread executing a first set of instructions stores first state information for the first thread in a common memory space and a second thread executing a second set of instructions stores second state information for the second thread in the common memory. The first state information may be identical or different from the second state information. State information for a thread may indicate a state of the thread executing a set of instructions.

Where the instance of a set of instructions is an instance of a game, the state information may indicate information about execution of the game at a particular state in the game corresponding to instructions that were executed. The state information may include an action that was executed prior that state, when the action was executed with respect to one or more instructions (e.g., a stage or a level in the game), a position or status of a variable at a state of execution, a location at the state of execution, one or more values of attributes related to a state of execution, other information about executing the game at a state corresponding to an instruction that was executed, or combinations thereof.

At block 406, information identifying threads may be obtained. The information may include an identifier of each thread. The threads may be identified as those for which information is to be captured. Information may be obtained via a communication or a signal. For example, an action thread may receive a signal identifying a set of threads for which to capture state information. Some or all of the threads executed at block 402 may be identified. To minimize impact on performance for obtaining state information, information identifying threads may be utilized to access the state information instead of the actual state information. In a process having many threads, communication of information, such as state information, may impact performance. As such, providing a minimal amount of information, such as identifiers of threads, may limit the communication of information between threads to minimize impact on performance on a process in an operating environment. By implementing threads in a single process, information may be efficiently captured by enabling threads within the process to access information from an accessible memory space (e.g., a common memory space).

In at least one embodiment, the information identifying threads may be obtained as a signal from a collector thread. The collector thread may be one of the threads executed at block 402. A collector thread may execute in a single process at the threads executed at block 402 to ensure that common memory space may be accessible. The collector thread may selectively determine threads for processing to capture state information. The collector thread may identify threads as a batch based on satisfying one or more criteria, such as threads that have reached a specific state of execution and/or a time period for execution. Threads may be identified as a batch periodically according to a schedule or until new state is reached. The collector thread may generate a signal and send the signal to the action thread. The signal may identify the threads from a batch that have been selected for capturing state information.

At block 408, responsive to the signal, information may be captured for each thread identified in the signal. Block 408 may be implemented for each signal that is received. An action thread may receive a plurality of signals, each identifying the same threads, different threads, or a combination thereof. Action thread may implement block 408 including blocks 410, 412, and 414, which may be implemented as a group to capture information for any single thread of the threads identified. Blocks 410, 412, 414 may be implemented for each thread. At block 410, a thread may be identified in the signal. A thread may be identified by a thread identifier. The thread identifier may be used to identify where information for the thread may be stored in the memory space. At block 412, state information may be read for the thread from the memory space.

At block 414, based on the state information, data may be computed for communication the thread. The data may be computed such that it includes data that identifies an action to be performed by the thread at the state of execution corresponding to the state information. The data may include other information related to the action such as a value related to movement at the state of execution when the instructions being executed as instruction for a game. The value related to the movement may be for a position in the instance of the game corresponding to the state of execution in the state information. In at least one embodiment, data may be computed for a thread using a set of rules. Different rules may be used for threads where the instructions being executed are different. In at least one embodiment, data may be computed for a thread using a model. The model may be generated based on training using historical data (e.g., previous actions for execution by a thread for a set of instructions) related to execution of the set of instructions. The model may be used to compute data for multiple threads, where each thread is executing an instance of a set of instructions. Different models may be used to compute data for different threads. Models may be trained based on one or more algorithms or learning techniques. For example, a model may be trained based on a machine learning technique. In some embodiments, data may be computed for a thread based on one or more reinforcement learning techniques. Different reinforcement learning techniques may be implemented for different threads, which are executing different instructions. For example, first data may be computed for a first thread using a first reinforcement learning technique, and second data may be computed for a second thread using a second reinforcement learning technique, wherein the first thread executes a first set of instructions that are different from a second set of instructions executed by the second thread.

In one illustrative example, block 408 may be implemented for two threads, a first thread and a second thread. The first thread may be identified in the signal and the second thread may be identified in the signal. First state information for the first thread may be read from the common memory space. Second state information for the second thread may be read from the common memory space. Based on the first state information, first data may be computed to be communicated to the first thread, such that the first data identifies a first action to be performed. Based on the second state information, second data may be computed to be communicated to the second thread, such that the second data identifies a second action to be performed.

In some embodiments, the computed data may be provided to each thread to which distinct data is computed. Data may be provided to a thread in a communication by the action thread to the thread. Data may be stored in the memory space, wherein the thread can access the data. The data may be stored with an identifier of the thread for which the data is computed. This may enable a thread to identify computed data assigned to the thread based on the associated identifier.

At block 416, each of the threads identified in the signal at block 406 may access data that is computed for that thread. In some embodiments, a thread may access the data from memory space where the action thread may have stored the data for the thread. A thread may receive the computed data from the action thread. For example, a first thread may receive first data computed by the action thread at block 414 and a second thread may receive second data computed by the action thread at block 414.

At block 418, an action indicated in the data accessed at block 416 by the thread may be performed. Each thread may perform the action in response to accessing the data computed for that thread. In some embodiments, an action thread may cause (e.g., send a signal) each of the threads identified in the signal at block 406 to perform an action indicated by the data computed for the thread.

Individual embodiments may be described as a process which can be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, the operations in flowchart 400 may be implemented in processing platform 130 of FIG. 1. Specifically, the operations may be implemented in a single process, e.g., process 132 in processing platform 130. Any of the processes may be implemented as a service accessible at a client system to a user of processing platform 130.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

V. Computer System Implementing an "ELF" Processing Platform

FIG. 5 illustrates an example of computer system 500, which may be used to implement certain embodiments described herein. For example, in some embodiments, computer system 500 may be used to implement any of the systems, servers, devices, or the like described above. As shown in FIG. 5, computer system 500 includes various subsystems including processing subsystem 504 that communicates with a number of other subsystems via bus subsystem 502. These other subsystems may include processing acceleration unit 506, I/O subsystem 508, storage subsystem 518, and communications subsystem 524. Storage subsystem 518 may include non-transitory computer-readable storage media including storage media 522 and system memory 510.

Bus subsystem 502 provides a mechanism for letting the various components and subsystems of computer system 500 communicate with each other as intended. Although bus subsystem 502 is shown schematically as a single bus, alternative embodiments of bus subsystem 502 may utilize multiple buses. Bus subsystem 502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 504 controls the operation of computer system 500 and may comprise one or more processors, application specific integrated circuits (ASICs), or field programmable gate arrays (FPGAs). The processors may include single core and/or multicore processors. The processing resources of computer system 500 may be organized into one or more processing units 532, 534, etc. A processing unit may include one or more processors, one or more cores from the same or different processors, a combination of cores and processors, or other combinations of cores and processors. In some embodiments, processing subsystem 504 may include one or more special purpose co-processors such as graphics processors, digital signal processors (DSPs), or the like. In some embodiments, some or all of the processing units of processing subsystem 504 may be implemented using customized circuits, such as application specific integrated circuits (ASICs), or field programmable gate arrays (FPGAs).

In some embodiments, the processing units in processing subsystem 504 may execute instructions stored in system memory 510 or on computer readable storage media 522. In various embodiments, the processing units may execute a variety of programs or code instructions and may maintain multiple concurrently executing programs or processes. At any given time, some or all of the program code to be executed may be resident in system memory 510 and/or on computer-readable storage media 522 including potentially on one or more storage devices. Through suitable programming, processing subsystem 504 may provide various functionalities described above. In instances where computer system 500 is executing one or more virtual machines, one or more processing units may be allocated to each virtual machine.

In certain embodiments, processing acceleration unit 506 may optionally be provided for performing customized processing or for off-loading some of the processing performed by processing subsystem 504 so as to accelerate the overall processing performed by computer system 500.

I/O subsystem 508 may include devices and mechanisms for inputting information to computer system 500 and/or for outputting information from or via computer system 500. In general, use of the term input device is intended to include all possible types of devices and mechanisms for inputting information to computer system 500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 500 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 518 provides a repository or data store for storing information and data that is used by computer system 500. Storage subsystem 518 provides a tangible non-transitory computer-readable storage medium for storing the basic programming and data constructs that provide the functionality of some embodiments. Storage subsystem 518 may store software (e.g., programs, code modules, instructions) that when executed by processing subsystem 504 provides the functionality disclosed herein. The software may be executed by one or more processing units of processing subsystem 504. Storage subsystem 518 may also provide a repository for storing data used in accordance with the teachings of this disclosure.

Storage subsystem 518 may include one or more non-transitory memory devices, including volatile and non-volatile memory devices. As shown in FIG. 5, storage subsystem 518 includes system memory 510 and computer-readable storage media 522. System memory 510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 500, such as during start-up, may typically be stored in the ROM. The RAM typically contains data and/or program modules that are presently being operated and executed by processing subsystem 504. In some implementations, system memory 510 may include multiple different types of memory, such as static random access memory (SRAM), dynamic random access memory (DRAM), and the like.

By way of example, and not limitation, as depicted in FIG. 5, system memory 510 may load application programs 512 that are being executed, which may include various applications such as Web browsers, mid-tier applications, relational database management systems (RDBMS), etc., program data 514, and operating system 516.

Computer-readable storage media 522 may store programming and data constructs that provide the functionality of some embodiments. Computer-readable media 522 may provide storage of computer-readable instructions, data structures, program modules, and other data for computer system 500. Software (programs, code modules, instructions) that, when executed by processing subsystem 504 provides the functionality described above, may be stored in storage subsystem 518. By way of example, computer-readable storage media 522 may include non-volatile memory such as a hard disk drive, a magnetic disk drive, an optical disk drive such as a CD ROM, DVD, a Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 518 may also include computer-readable storage media reader 520 that may further be connected to computer-readable storage media 522. Reader 520 may receive and be configured to read data from a memory device such as a disk, a flash drive, etc.

In certain embodiments, computer system 500 may support virtualization technologies, including but not limited to virtualization of processing and memory resources. For example, computer system 500 may provide support for executing one or more virtual machines. In certain embodiments, computer system 500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 500. Accordingly, multiple operating systems may potentially be run concurrently by computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to establish a communication channel to one or more client devices via the Internet for receiving and sending information from and to the client devices.

Communication subsystem 524 may support both wired and/or wireless communication protocols. For example, in certain embodiments, communications subsystem 524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 524 may provide wired network connectivity (e.g., Ethernet) in addition to or instead of a wireless interface.

Communication subsystem 524 may receive and transmit data in various forms. For example, in some embodiments, in addition to other forms, communications subsystem 524 may receive input communications in the form of structured and/or unstructured data feeds 526, event streams 528, event updates 530, and the like. For example, communications subsystem 524 may be configured to receive (or send) data feeds 526 in real-time from users of social media networks and/or other communication services such as web feeds and/or real-time updates from one or more third party information sources.

In certain embodiments, communications subsystem 524 may be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 524 may also be configured to communicate data from computer system 500 to other computer systems or networks. The data may be communicated in various different forms such as structured and/or unstructured data feeds 526, event streams 528, event updates 530, and the like to one or more databases that may be in communication with one or more streaming data source computers coupled to computer system 500.

Computer system 500 may be one of various types, including a handheld portable device, a wearable device, a personal computer, a workstation, a mainframe, a kiosk, a server rack, or any other data processing system. Due to the ever-changing nature of computers and networks, the description of computer system 500 depicted in FIG. 5 is intended only as a specific example. Many other configurations having more or fewer components than the system depicted in FIG. 5 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
    executing, by one or more processors, a plurality of threads, the plurality of threads sharing a common memory space, the plurality of threads comprising:
        a first thread executing a first set of instructions,
        a second thread executing a second set of instructions, and
        an action thread executing in a same process as the first thread and the second thread, wherein the action thread is configured to access the shared common memory space;
    storing, by the first thread, in the common memory space, first state information for the first thread;
    storing, by the second thread, in the common memory space, second state information for the second thread;
    receiving, by the action thread, a signal identifying the first thread and the second thread;
    responsive to receiving the signal, performing by the action thread:
        reading the first state information for the first thread from the common memory space,
        computing, based on the first state information, first data to be communicated to the first thread, the first data identifying a first action to be performed,
        reading the second state information for the second thread from the common memory space, and
        computing, based on the second state information, second data to be communicated to the second thread, the second data identifying a second action to be performed;
    receiving, by the first thread and from the action thread, the first data computed by the action thread;
    receiving, by the second thread and from the action thread, the second data computed by the action thread;
    performing, by the first thread, the first action indicated in the first data; and
    performing, by the second thread, the second action indicated in the second data.

2. The computer-implemented method of claim 1, further comprising:
    selecting, by a collector thread included in the plurality of threads, the first thread and the second thread for processing by the action thread; and
    sending, by the collector thread, to the action thread, the signal identifying the first thread and the second thread.

3. The computer-implemented method of claim 1, wherein the first set of instructions is different from the second set of instructions.

4. The computer-implemented method of claim 1, wherein executing the first set of instructions comprises executing an instance of a first game, and wherein executing the second set of instructions comprises executing an instance of a second game.

5. The computer-implemented method of claim 1, wherein the first set of instructions is identical to the second set of instructions, wherein the first thread executes the first set of instructions as an instance of the first set of instructions, and wherein the second thread executes the second set of instructions as an instance of the second set of instructions.

6. The computer-implemented method of claim 1, wherein the first state information is different from the second state information.

7. The computer-implemented method of claim 1, wherein the first state information is identical to the second state information.

8. The computer-implemented method of claim 1, wherein the first state information indicates a first state of executing the first set of instructions, and wherein the second state information indicates a second state of executing the second set of instructions.

9. The computer-implemented method of claim 1, wherein executing the first set of instructions comprises executing an instance of a game, and wherein the first state information indicates a state of execution for the instance of the game.

10. The computer-implemented method of claim 9, wherein the state of execution for the instance of the game corresponds to a position in the instance of the game.

11. The computer-implemented method of claim 1, wherein executing the first set of instructions comprises executing an instance of a game, wherein the first state information indicates a state of execution for the instance of the game, and wherein the first data includes a value related to movement at the state of execution for the instance of the game.

12. The computer-implemented method of claim 1, wherein computing the first data comprises using, by the action thread, a set of rules to compute the first data, and wherein computing the second data comprises using, by the action thread, the set of rules to compute the second data.

13. The computer-implemented method of claim 1, wherein computing the first data comprises using, by the action thread, a model to compute the first data, wherein the model is trained using historical data related to execution of the first set of instructions; and
computing the second data comprises using, by the action thread, the model to compute the second data.

14. The computer-implemented method of claim 13, wherein the model is trained based on a machine learning technique.

15. The computer-implemented method of claim 1, wherein computing the first data comprises using, by the action thread, a reinforcement learning technique to compute the first data, and wherein computing the second data comprises using, by the action thread, the reinforcement learning technique to compute the second data.

16. A system comprising:
one or more processors; and
a memory accessible to the one or more processors, the memory storing one or more instructions that, upon execution by the one or more processors, causes the one or more processors to:
execute a plurality of threads, the plurality of threads sharing a common memory space, the plurality of threads comprising:
a first thread executing a first set of instructions,
a second thread executing a second set of instructions, and
an action thread executing in a same process as the first thread and the second thread, wherein the action thread is configured to access the shared common memory space;
store, by the first thread, in the common memory space, first state information for the first thread;
store, by the second thread, in the common memory space, second state information for the second thread;
receive, by the action thread, a signal identifying the first thread and the second thread;
responsive to receiving the signal, perform by the action thread:
reading the first state information for the first thread from the common memory space,
computing, based on the first state information, first data to be communicated to the first thread, the first data identifying a first action to be performed,
reading the second state information for the second thread from the common memory space, and
computing, based on the second state information, second data to be communicated to the second thread, the second data identifying a second action to be performed;
receive, by the first thread and from the action thread, the first data computed by the action thread;
receive, by the second thread and from the action thread, the second data computed by the action thread;
perform, by the first thread, the first action indicated in the first data; and
perform, by the second thread, the second action indicated in the second data.

17. The system of claim 16, wherein the one or more instructions which, upon execution by the one or more processors, further causes the one or more processors to:
select, by a collector thread included in the plurality of threads, the first thread and the second thread for processing by the action thread based on:
identifying, by the collector thread, a change in state of execution for the first thread; and
identifying, by the collector thread, a change in state of execution for the second thread; and
send, by the collector thread, to the action thread, the signal identifying the first thread and the second thread.

18. The system of claim 16, wherein executing the first set of instructions comprises executing an instance of a first game, wherein executing the second set of instructions comprises executing an instance of a second game, and wherein the first game is different from the second game.

19. A non-transitory computer-readable storage medium storing instructions executable by one or more processors, the instructions, which upon execution by the one or more processors, cause the one or more processors to:
execute a plurality of threads, the plurality of threads sharing a common memory space, the plurality of threads comprising:
a first thread executing a first set of instructions,
a second thread executing a second set of instructions, and
an action thread executing in a same process as the first thread and the second thread, wherein the action thread is configured to access the shared common memory space;
store, by the first thread, in the common memory space, first state information for the first thread;
store, by the second thread, in the common memory space, second state information for the second thread;
receive, by the action thread, a signal identifying the first thread and the second thread;
responsive to receiving the signal, perform by the action thread:
reading the first state information for the first thread from the common memory space,
computing, based on the first state information, first data to be communicated to the first thread, the first data identifying a first action to be performed,
reading the second state information for the second thread from the common memory space, and computing, based on the second state information, second data to be communicated to the second thread, the second data identifying a second action to be performed;

receive, by the first thread and from the action thread, the first data computed by the action thread;

receive, by the second thread and from the action thread, the second data computed by the action thread;

perform, by the first thread, the first action indicated in the first data; and perform, by the second thread, the second action indicated in the second data.

20. The non-transitory computer-readable storage medium of claim 19, wherein executing the first set of instructions comprises executing an instance of a game, wherein the first state information indicates a state of execution for the instance of the game, the state of execution in the game corresponding to a position in the instance of the game, and wherein the first data includes a value related to movement at the position in the instance of the game.

* * * * *